United States Patent [19]

Haefner

[11] Patent Number: 4,491,016

[45] Date of Patent: Jan. 1, 1985

[54] METHOD AND APPARATUS FOR MEASURING THE PRESSURE OF A FLUID

[75] Inventor: Hans W. Haefner, Aichach, Fed. Rep. of Germany

[73] Assignee: Pfister GmbH, Fed. Rep. of Germany

[21] Appl. No.: 438,513

[22] Filed: Nov. 1, 1982

[30] Foreign Application Priority Data

Nov. 5, 1981 [DE]  Fed. Rep. of Germany ....... 3143919
Aug. 10, 1982 [DE]  Fed. Rep. of Germany ....... 3229721

[51] Int. Cl.³ ............................................. G01F 23/18
[52] U.S. Cl. ......................................... 73/302; 73/301; 73/745; 137/403
[58] Field of Search ................. 73/302, 296, 301, 744, 73/745, 708, 37.8; 137/392, 403

[56] References Cited

U.S. PATENT DOCUMENTS

| | | | |
|---|---|---|---|
| 1,428,576 | 9/1922 | Abrahams | 73/302 |
| 1,857,644 | 5/1932 | Knobloch | 73/299 |
| 2,613,535 | 10/1952 | Born | 73/302 |
| 3,442,135 | 5/1969 | Liu | 73/744 |
| 3,916,130 | 10/1975 | Cade | 73/302 |
| 3,961,533 | 6/1976 | Bennett | 73/744 |
| 4,111,044 | 9/1978 | McClure | 73/302 X |
| 4,236,412 | 12/1980 | Myrick | 73/706 |
| 4,258,745 | 3/1981 | Nicholson | 137/403 |
| 4,280,362 | 7/1981 | Haag | 73/744 X |
| 4,355,280 | 10/1982 | Duzich | 73/745 X |
| 4,413,526 | 11/1983 | Delajoud | 73/745 |

FOREIGN PATENT DOCUMENTS

| | | | |
|---|---|---|---|
| 654350 | 7/1936 | Fed. Rep. of Germany | 73/302 |
| 1206174 | 12/1965 | Fed. Rep. of Germany | 73/296 |
| 2747111 | 4/1979 | Fed. Rep. of Germany | 73/299 |
| 2807041 | 8/1979 | Fed. Rep. of Germany | 73/302 |

OTHER PUBLICATIONS

"Zur Bestimmung der Menge von Erdölprodukten in Stehtanks", H. Lerch, Swiss Engineer and Architect, No. 5, 1980.
Contractie Van DeWand Van Een Tank Onder Invloed Van De Hydrostatisch Druk In De Tank A.C. Bijloo.

Primary Examiner—Daniel M. Yasich
Attorney, Agent, or Firm—Hill, Van Santen, Steadman & Simpson

[57] ABSTRACT

A method and apparatus for measuring a pressure, particularly the pressure of a fluid, employ a pressure-charged measuring piston movable in a cylinder and connected to a load or displacement measuring device. The piston is maintained floating or contact-free within the cylinder by hydrostatic or pneumatic fluid in the form of a release agent supplied between the piston and the cylinder under pressure.

28 Claims, 7 Drawing Figures

METHOD AND APPARATUS FOR MEASURING THE PRESSURE OF A FLUID

BACKGROUND OF THE INVENTION

The present invention relates to methods and devices for measuring a pressure, particularly the stationary or quasi-stationary pressure of a fluid utilizing a pressure-charged measuring system conducted in a cylinder, the piston being connected to a load measuring unit.

The use of a measuring piston conducted in a cylinder for measuring a pressure is well known in the art as represented by the teachings of German AS No. 12 06 174. A problem associated with such conventional pressure measuring devices is that the measuring piston exhibits a relatively high surface friction relative to the cylinder thereby decreasing the measurement precision attainable with such devices. Such conventional measuring devices also exhibit relatively leakage losses and are thus utilized only for obtaining coarse measurements.

In practice, however, a significant need exists for extremely precise pressure measuring devices, particularly for measuring the stationary or quasi-stationary pressure of a fluid such as, for example, for determining the mass (also sometimes referred to as the "weight") of the contents of vertical tanks in tank storage facilities for petroleum products. Other uses for precise pressure measuring devices are, by way of example, in wind tunnel testing for monitoring dynamic pressure. Such applications require pressure measuring devices of the highest precision which exhibit an uncomplicated structure and operation.

Heretofore, pressure measuring devices used, for example, for the gravimetric determination of the amount of petroleum product in vertical tanks exhibit, because of the above-described difficulty in conducting such measurements, an overall error quotient in the magnitude of ±0.5% in volume and ±1% in the value for the mass derived therefrom. In the case of vertical petroleum product tanks, these errors are due, inter alia, to the circuitous route followed by the fluid in the tank to the measuring device, the temperature influence on the petroleum, and mechanical influences on the tank itself. Due to the current high cost of certain petroleum products, errors of the magnitude described above may make a difference, expressed in monetary terms, of 500,000 DM for a single tanker load. The above problems in the industry are described in an article entitled "Übliche Methoden zur Bestimmung der Menge von Erdölprodukten in Stehtanks" (Standard Methods for Determining the Amount of Petroleum Products in Vertical Tanks), H. Lerch, appearing in the periodical "Schweizer Ingenieur und Architekt", No. 5, 1980, Schweizerischer Ingenieurs- und Architekten-Verein, Verlag der akademischen Technischen Vereine, Zürich.

As described therein, volume determinations may be undertaken by means of identifying the height of the liquid level in the container or of a representative liquid column. As used herein, the term "vertical tank" refers to a cylindrical container consisting of steel having a vertical axis of the type which is generally employed in storage facilities for storing large amounts of petroleum product. Such a tank may have dimensions of approximately 50 m in diameter and a height in the range of 20 through 25 m.

One method for determining the height of the liquid level in such a tank is to lower a weighted tape measure connected to the top or roof of the tank until the weight touches the so-called reference plate in the floor of the tank. The filling height is read on the scale of the measuring tape. The volume is calculated from the cross-sectional surface integral of the tank and the filling height of the tank. Because the liquid contained in the tank, as well as the tank itself, exhibit a not inconsiderable thermal coefficient of expansion, the result obtained from the measurement must be correlated to a reference temperature. Additionally, the tank expands differentially along its vertical dimension as a result of the increasing liquid pressure at different heights above the floor of the tank and thus the cross-sectional area of the tank will differ at different heights.

If the weight of the tank contents is to be determined utilizing conventional measuring methods, the weight must be calculated from the volume and the density of the material contained in the tank. Determining the density of the contained material with a sufficient degree of precision is difficult, particularly in the case of hydrocarbon fluids such as, for example, gasoline, which exhibit a coefficient of volume expansion on the order of 0.1%/K, thereby requiring that different temperature layers within the tank be taken into consideration. As stated above, an error factor of ±0.5% in the volume determination and of ±1% in the mass determination is standard with most conventional measuring methods and devices. Similar orders of error are also present for volume measurements undertaken with flow meters, and may be even higher under certain conditions due to wear of such devices.

The above sources of measuring error have a particularly disadvantageous effect when, for example, a portion of the total tank volume is removed from or added to an existing amount of liquid in the tank so that the difference or addition of two successive measurements must be calculated in order to determine the new amount of liquid in the tank, whereby the measuring errors add together under the least favorable conditions.

Another known method for determining the level of liquid in a container, and hence the volume or weight of the liquid, is by the use of so-called buoyancy measurement employing a buoyant member with a scale. This measuring method also exhibits problemmatical sources of error particularly in vertical tanks having a floating roof wherein the introduction of the float is difficult and undesirable because of the unavoidable necessity of providing an opening in the floating roof. Similar considerations apply to containers having a fixed top or roof which also require a passage for the float. Additionally, the measuring means must be encapsulated gas tight so as to be explosion-proof and also to prevent the unwanted release of vapors which may constitute a substantial fire hazard. One attempt to overcome these problems is to accommodate the measuring means in a measuring container which is erected separately next to the tank, however, such a separate structure results in a significantly higher cost, and the problem of sealing is not solved. Additionally, changes in the buoyancy characteristics of the float due, for example, to corrosion, may falsify measurements.

It is an object of the present invention to provide a method and apparatus for measuring a pressure, particularly a stationary or quasi-stationary pressure of a fluid, utilizing a pressure-charged measuring piston conducted in a cylinder and connected to a load measuring means, which method and apparatus combine the highest precision with uncomplicated operation.

Another object of the present invention is to provide such a method and apparatus which provide a pressure measurement independent of temperature.

It is a further object of the present invention to provide such a method and apparatus which permit the pressure measurement to be displayed at any selected location, even at a great distance from the tank.

The above objects are inventively achieved in a pressure measuring method and apparatus which utilize a release agent supplied under pressure between the piston and cylinder such that the piston "floats" within the cylinder in contact-free fashion.

When the piston is conducted in this floating manner within the cylinder in accordance with the principles of the present invention, the wall friction between the piston and cylinder is negligibly small, particularly for a measuring piston held immovably in the cylinder by a load measuring means. As a result, only the pressure which is to be measured influences the piston surface and thus, if the piston is supported by a substantially force-free weighing cell utilized as the load measuring means, a measurement output of the highest precision is obtained.

The measuring method and apparatus disclosed and claimed herein substantially eliminates the above measuring errors unavoidably present in conventional devices. In particular, the influence of temperature is eliminated and thus need not be taken into consideration in determining the pressure of a fluid column as the first measurement undertaken for a gravimetric aggregate measurement.

The above result is achieved with relatively low material outlay due to the uncomplicated nature of the structure for the measuring device. In addition, the measuring system is distance-independent with respect to the structure containing the fluid being measured because the measurement is undertaken with a stationary pressure column and therefore no movement and thus no resistances and corresponding pressure changes are encountered in the measuring lines. In order to eliminate these potential problems, the release agent is supplied to the piston and cylinder at a higher pressure than the fluid to be measured.

A high degree of flexibility in the application of the method and apparatus for measuring a pressure disclosed and claimed herein is achieved because the fluid generating the pressure may be simultaneously employed as the release agent. Alternatively, a different fluid, in the form of a liquid or gas (preferably air) may be utilized. If the fluid generating the pressure to be measured is utilized as the release agent, the pressure of that fluid is increased before introduction into the cylinder as the release agent.

If a liquid is utilized as the release agent, such a liquid should have a higher specific gravity than the fluid to be measured, should be immiscible with the fluid generating the pressure to be measured, and should be non-combustible so as to not be an explosion hazard. By way of example, the contents of a benzene tank could be measured utilizing water as the release agent. If a separating vessel is utilized providing a boundary preventing contact between the two different fluids is utilized, the difference in the specific gravities of the fluids can be neglected because it is only necessary to identify volume differences in the fluid generating the pressure to be measured.

The head of pressure for the release agent is dependent upon a series of factors and is therefore not numerically fixed. The release agent simultaneously performs the two functions of sealing the measuring chamber in the cylinder, that is, the volume which is charged with the pressure to be measured between the cylinder and the piston, against loss of pressure and maintains the gap between the piston and cylinder walls in the form of a lubricant layer so that contact of the walls does not occur. The head of the release agent so confined predominantly depends upon its kinetic viscosity, which may widely vary for different gases and liquids, and further depends upon the surface size and height of the gap and, to a slight degree, on the temperature of the system.

As stated above, the pressure of the release agent must be higher than the pressure of the fluid to be measured which in practice means that the pressure of the release agent must be at least high enough such that the confining function relative to the measured fluid and the contact free piston/cylinder condition are both achieved.

As a result of the extremely high precision obtainable with the method and apparatus disclosed and claimed herein, the method and apparatus may be particularly advantageously employed in the gravimetric determination of the amount of petroleum product in a stationary tank, such as a bulk storage tank. The error factor which is present in conventional methods and devices for undertaking such a gravimetric measurement is reduced by at least a factor of 10 to approximately ±0.1%. Additionally, errors present in standard devices which compound when aggregate measurements are combined are substantially eliminated, as are errors due to the influence of temperature or the circuitous route over which the liquid in such standard devices must travel in order to be measured.

In one embodiment of the method and apparatus, the pressure to be measured is transmitted directly to the piston from the vessel containing the fluid. In this embodiment, the line from the tank to the measuring piston is filled with the fluid to be measured. In some instances, particularly wherein a longer line arrangement with a network of measuring lines filled with fluid may be undesirable for safety reasons, the measurement may be undertaken by transmitting the pressure to be measured onto the piston from the fluid by means of a gas, such as air.

The piston for the pressure measuring device disclosed and claimed herein may have a plurality of grooves or pockets in its exterior wall in order to permit hydrostatic or pneumatic accumulation of the release agent thereby improving lubrication. Such pockets may also be disposed in the interior wall of the cylinder and are connected to the release agent supply system.

The measuring piston, as a result of being supported by the measuring unit, forms an essentially force-free weighing system in combination with the measuring unit in which the influence of friction due to dynamic forces of the release agent is negligibly small (practically 0) when such pockets are utilized. Any frictional influence between the piston and cylinder is substantially eliminated, at least in the range of measureable magnitudes.

If a liquid is utilized as the release agent, the cylinder may have a floor including a collecting trough for the release agent and a return line to the release agent supply system for recycling and reusing the release agent. A central opening is provided in the floor of the cylinder for the contact-free passage of a support element connecting the measuring piston to the measuring means.

In the application of the method and apparatus disclosed and claimed herein for the gravimetric identification of the amount of petroleum product in a stationary tank, such as a bulk storage tank, the measured value generator may be connected to a computer to which further parameters such as the size of the effective piston surface of the measuring piston, the integral of the effective cross-sectional area of the tank, and the change of such cross-sectional area under the influence of temperature, as well as weight forces of the liquid, may be supplied for correcting the initial determination of the gravimetric tank contents represented by the signal from the measured value generator.

A network of measuring lines may be provided for a tank storage facility having a plurality of tanks. The network may be equipped with a plurality of switches or valves for connection and disconnection of individual tanks with the measuring apparatus. This arrangement has the advantage that a plurality of tanks can be alternately connected to the measuring means. This permits not only tanks containing the same material but also tanks containing different materials to be monitored if the pressure of the material within the respective tanks is transmitted to the piston indirectly by means of a gas or, if direct transmission of the liquid pressure to the piston is utilized, an additional means may be provided for blowing out the measuring lines after measurement of the fluid in one tank before proceeding to measure a different fluid in another tank.

When measuring a fluid pressure, particularly for combustible fluids, most safety regulations require a hermetic separation between the fluid to be measured and the release agent contained in the system of the measuring device. In a further embodiment of the invention, therefore, such a hermetic separation is provided between the fluid to be measured and the release agent such that those two materials do not come into contact. This hermetic separation does not negatively influence the measuring precision obtained with the method and apparatus disclosed herein thus permitting safe measurement of highly volutile fluids to be undertaken. The separation may be achieved by the use of a resilient or expandable separating element, such as a bellows. In the use of such a resilient separating member, it is essential for precise measurements that the pressure of the release agent be matched to the pressure of the fluid to be measured such that an equilibrium of forces is present on the surfaces of the separating element.

In a further embodiment of the invention, the resilient separating element is disposed in the measuring device such that only one side of the separating element is connected to a feed line for the fluid to be measured, and the other side of the separating element is in connection with a feed line for the release agent. The separating element is held in a neutral position given equilibrium forces and is connected to an indicator means for monitoring the neutral position. The pressure of the release agent normally opposes a change in position of the separating member caused by a change in the pressure of the fluid to be measured.

DESCRIPTION OF THE PREFERRED EMBODIMENTS

Figure 1:
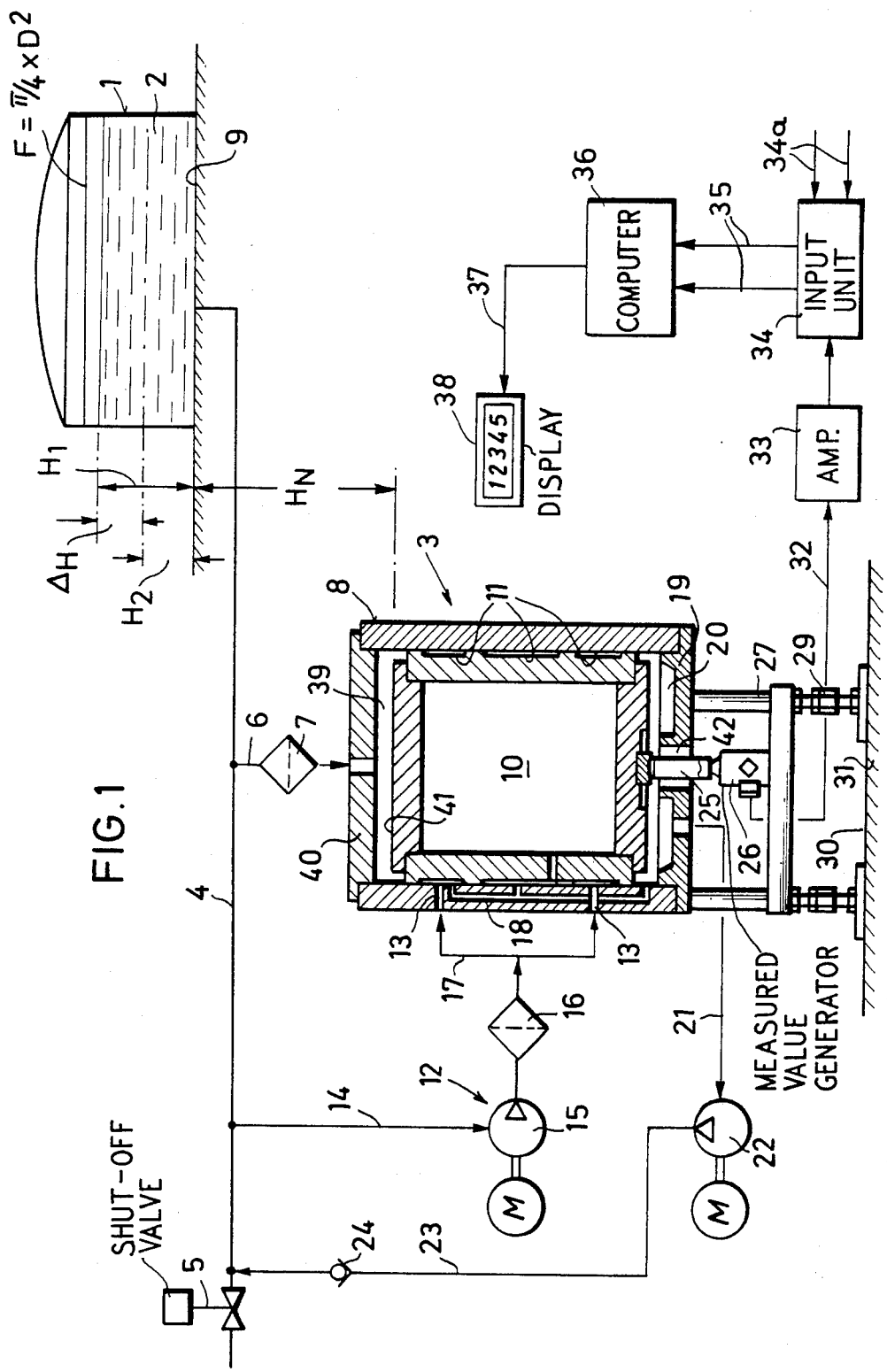
FIG. 1 is a schematic representation, partly in section, of an apparatus for undertaking a gravimetric tank contents measurement constructed in accordance with the principles of the present invention.

An apparatus for measuring a pressure constructed and operable in accordance with the principles of the present invention is shown in FIG. 1. In the embodiment of FIG. 1, the measuring device 3 is connected to a supply tank 1 which is filled to a height $H_1$ with a fluid 2 such as, for example, a petroleum product. The level of the fluid 2 in the tank 1 is to be measured with the measuring device 3. The tank 1 may be, for example, an above-ground cylindrical vertical tank having a diameter of 50 m and a height (of the cylindrical portion) of 25 m. Such a tank has a capacity of approximately 50,000 tons of petroleum product.

For receiving and discharging portions of the total contents of the tank 1, the tank 1 is connected to an underground network of supply lines only one portion of which referenced 4 is shown in FIG. 1. The line 4 is operated by a shut-off valve 5. The line 4 may have a nominal diameter of 400 mm. A measuring line 6, having a nominal diameter of 10 mm is connected to the line 4. The measuring line 6 is connected via a filter 7 to a cylinder 8 of the measuring device 3. Under certain conditions, the measuring device 3 may be stationarily disposed in an underground measuring room (not shown in the drawing) below a level of the floor 9 of the tank 1. A measuring piston 10 is disposed within the cylinder 8 having an exterior wall with a plurality of pockets 11 therein which are connected by means of channels 13 to a supply device 12 for supplying hydrostatic fluid to the device 3.

In the embodiment of FIG. 1, the petroleum product 2 in the tank 1 is utilized as the hydrostatic fluid, referred to herein as the release agent (also referred to in the art as a separating agent). For this purpose, the supply device 12 is connected to the line 4 from the tank 1 by means of a branch line 14. The supply device also includes a pump 15, a filter 16, and a pressure line 17 which injects the petroleum product utilized as the release agent through the channels 13 under increased pressure into the pockets 11 between the piston 10 and the interior wall of the cylinder 8. Leakage release agent is diverted through the channels 18 in the wall of the cylinder 8 to the floor 19 of the cylinder 8 which has a plurality of collecting pockets 20. The release agent collected in the pockets 20 is pumped back into the main line 4 over a leakage return line 21 by a pump 22 driven by a motor M which is connected to an intermediate return line 23 having a check valve 24.

Under the influence of the release agent introduced under pressure from the supply device 12 into the pockets 11 of the piston 10, the piston 10 "floats" contact-free within the cylinder 8 and is thus substantially free of any external force which may influence the idle or rest condition of the measuring device 3. In other words, the piston 10 is conducted substantially friction free within the cylinder 8.

The piston 10 is vertically supported by a support element 25 connected to a measured value generator 26 which is rigidly mounted in a frame 27 for the device 3. In order to obtain a precisely vertical alignment of the measuring device 3, the frame 27 is mounted on the floor 30 of a foundation 31 with adjustable threaded feet 29.

The electronic function units required for processing and analyzing the signal from the measured value generator 26 are connected thereto via a signal line 32. These electronic function units include a signal amplifier 33, an input unit 34, computer input lines 35, a computer 36, an output signal line 37 and a display unit 38. The input unit 34 has input lines 34a for entering error correction factors such as temperature and fluid pressure which cause an expansion of the tank 1. The computer 36 calculates the corrected value for the gravimetric container contents based on the signal supplied by the measured value generator 26 and forwards the result of the calculation via the output signal line 37 to the display unit 38. The display unit 38 may be of any suitable type well known to those skilled in the art and may be equipped with a printer.

The operation of the pressure measuring device 3 shown in FIG. 1 is greatly simplified in comparison with known devices of this type. A measuring chamber 39 between the cylinder cover 40 and the upper side 41 of the piston 10 is directly loaded by the pressure of the fluid column H1 in the tank 1 by virtue of the connection of the measuring device 3 to the tank 1 via the lines 4 and 6. The piston 10 transmits this load through the support element 25, which is conducted contact-free through a central opening 42 in the floor 19 of the cylinder 8, to the measured value generator 26 which transmits the measured value, that is, an electrical signal having a magnitude (such as, for example, amplitude, duration, or any other variable parameter) corresponding to the force exerted by the piston 10 on a known weighing cell due to the pressure head of the column H1, over the signal line 32 to the signal amplifier 33 and subsequently to the computer 36 via the input unit 34 so that finally the weight of the liquid column $H_1 + H_N$ is measured, wherein $H_N$ is the height difference between the tank floor 9 and the upper side 41 of the piston 10. The temperature-caused expansion or contraction of the fluid column thus plays no part in the measurement of the weight of the column. This important feature of the invention can be understood with the help of an analogy to a solid body, such as an aluminum pipe 20 m in height having a weight of 20 kp. If the pipe expands by 10 mm under the influence of a rising temperature the weight remains exactly 20 kp. Similarly, if the pipe contracts by 10 mm due to a falling temperature, the weight still remains exactly 20 kp. The same conditions apply to determining the weight for the liquid column in the manner disclosed and claimed herein. Although the volume may change randomly under the influence of changing temperatures, the weight nonetheless remains constant, being unaffected by the temperature changes.

With the gravimetric measuring method according to the invention executed with the device shown in FIG. 1, the influence of temperature, which was heretofore the most difficult error-introducing factor to eliminate, is completely avoided. In particular, in tanks of the size described as an example for the tank 1, substantially different temperatures are encountered at different heights within the tank 1, and thus entirely different density conditions for the fluid 2 contained therein are present. These sources of error are also avoided with the method and apparatus disclosed herein. Moreover, when differential amounts are to be measured by means of two volume measurements, such as differential amounts resulting from adding or subtracting portions of the total tank capacity to or from an existing amount of fluid in the tank, errors of the two measurements in conventional devices under the least favorable conditions could add, thereby compounding the measurement error. No such error compounding occurs with measurements undertaken in accordance with the method and apparatus disclosed and claimed herein. As an example, assume that a portion of the fluid 2 is removed from the tank 1 shown in FIG. 1 such that the original level at H1 is decreased by $\Delta H$ to a new level $H_2$ ($H_1 - H_2 = \Delta H$). The effective surface integral $F = (\pi/4)(D^2)$ divided by the effective surface of the measuring piston 10 gives the weight of the discharged fluid in tons. Because the primary energy inherent in petroleum products utilized as fuel is directly dependent upon the weight of the product, the product weight is of primary interest when determining the amount of such petroleum product in question. The same also applies for petroleum products utilized for the purpose of further petrochemical processing in the chemical industry.

In the above example of determining the weight differential $\Delta H$, the fluid column $H_1$ is measured by the measuring device 3 before discharging the fluid with an error factor of less than 1%. The same measurement is carried out with the same precision by means of gravimetric measurement using the measuring device 3 of the remaining liquid column $H_2$ after discharge, whereby $\Delta H$ is derived from the difference of the two heights. The corresponding weight differential $\Delta G$ is derived from the equation $\Delta G = \Delta H \cdot K$, wherein K is the error-corrected quotient of the surface area of the tank 1 divided by the effective surface area of the measuring piston 10.

The above example demonstrates that the calculation of the weight of the contents of the tank 1 is uncomplicated and can be executed with a fraction of the outlay heretofore necessary and with an error factor which is at least 10 times less than error factors standard in conventional measuring devices.

Figure 2:
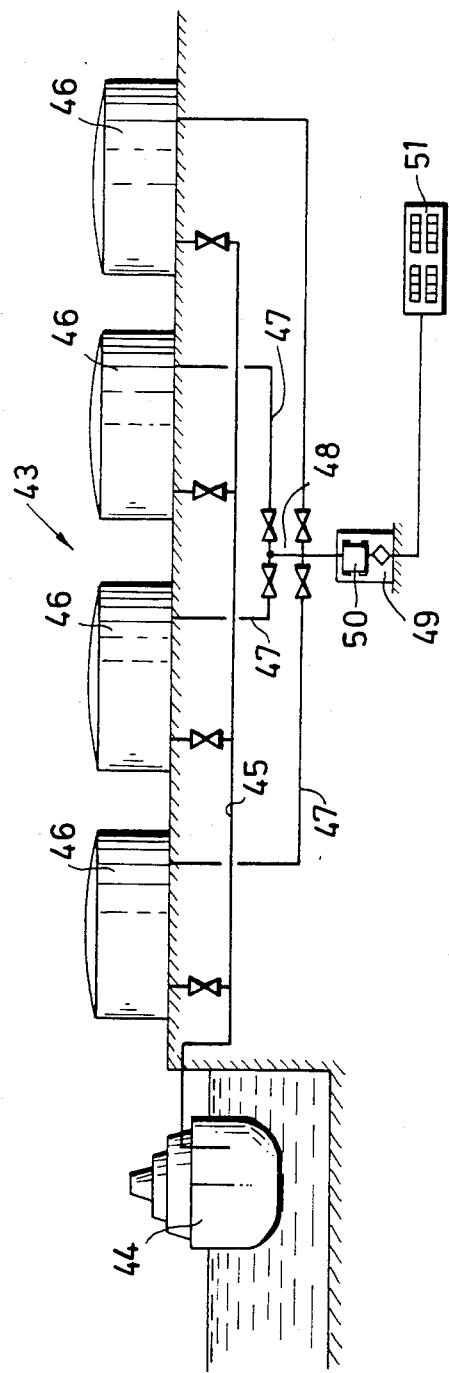
FIG. 2 is a schematic representation of a tank storage facility having a plurality of storage tanks connected to a pressure measuring device by a network of measuring lines constructed in accordance with the principles of the present invention.

FIG. 2 shows a storage facility 43 having a plurality of storage tanks 46. Crude oil is pumped from a tanker 44 over a network 45 into the tanks 46. In accordance with the principles of the present invention, each tank is connected by measuring lines 47 via switch or valve elements 48 to a measuring device 50 constructed in accordance with the principles of the present invention contained in a measuring room 49. The measuring lines 47 can be selectively connected and disconnected by the switch elements 48 by operation of a control and measuring console 51, which may be disposed at any desired location. The individual tanks 46 may thus be connected via one measuring line 47 with the measuring device 50.

Figure 3:
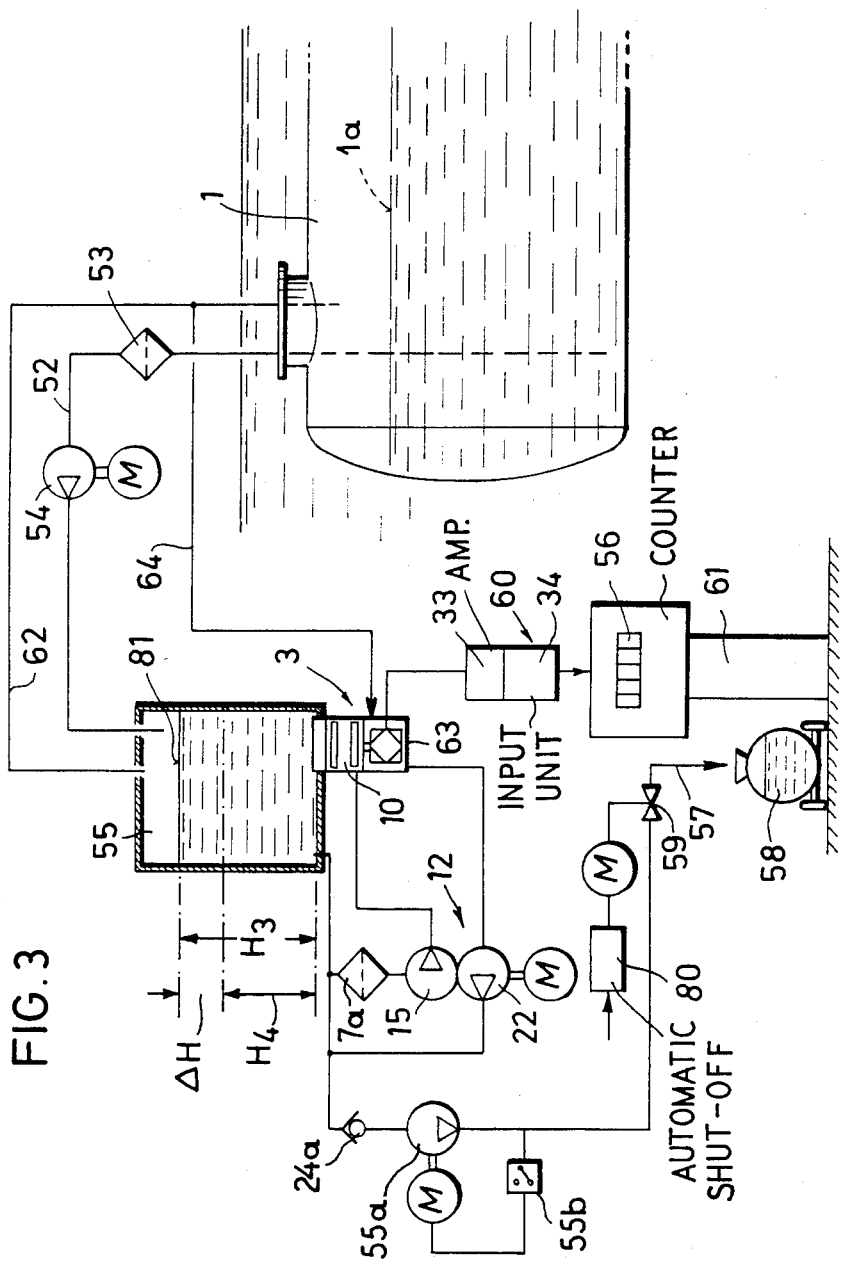
FIG. 3 is a schematic representation, partly in section, of a pump for petroleum products utilizing an apparatus for gravimetric tank contents measurement constructed in accordance with the principles of the present invention.

A pumping station for petroleum products is shown in FIG. 3 utilizing the measuring device 3 constructed in accordance with the principles of the present invention. The supply tank 1, which in this installation is generally disposed underground, is connected via a discharge line 52 having a filter 53 to a discharge pump 54 operated by a motor M, which is in turn connected to a stationarily disposed measuring tank 55. The tank 55 is filled to any desired filling height H3 at which point the counter 56 for the output pump 61 is set to 0. After discharging a dispensed amount of petroleum product (indicated by the arrow 57) into a tank car 58 via a discharge valve 59, the level H4 of the fluid in the measuring tank 55 is identified with the measuring device 3 and the dispensed amount is calculated in weight units by the electronic unit 60, consisting of the signal amplifier 33 and the input unit 34. An output signal from the input unit 34 is supplied to the counter 56. If a prescribed amount of product is to be dispensed, an auxiliary automatic shut-off means 80 may undertake automatic closure of the discharge valve 59.

In the manner already described in connection with FIG. 1, the measuring device 3 in the embodiment of FIG. 3 is supplied with release agent by the supply device 12 which is tapped from the petroleum product whose weight is to be measured. The release agent is supplied under increased pressure by the pump 15, with leakage fluid being returned by the pump 22. As an example, the petroleum product to be dispensed may be a propane/butane mixture which develops a vapor pressure on the order of approximately 0.5 through 1.5 bar at room temperature of approximately 20° C. This vapor loads the liquid level 81 of the measuring tank 55 and the liquid level 1a of the tank 1, the two vapor chambers being balanced by means of the line 62 interconnected between those tanks. In order to eliminate the influence of the vapor pressure on the measured result, the measuring device 3 is equipped with a measuring cylinder 63 closed at both sides, with the measuring piston 10 being charged from above by the liquid column H3 (or H4) with the vapor pressure added thereto, and is charged from below by the vapor pressure from the line 64. In this manner, the influence of the vapor pressure is compensated to 0 so that the influence of both vapor pressure and temperature are eliminated so that the measuring device 3 calculates the desired measurement of the weight differential $\Delta H = H_3 - H_4$ substantially error free. The discharge pump employing the measuring device 3 thus overcomes difficulties and gross errors in content measurement which have heretofore been accepted as being unavoidable. The measuring tank 55 may be stationarily installed and equipped with the measuring device 3, whereby a measuring precision of less than 1% error is achieved. The installation shown in FIG. 3 may also be utilized as a service station means for filling passenger cars and trucks. Direct removal from the horizontally disposed underground tank 1 is also taken into consideration by the configuration of the installation shown in FIG. 3, wherein the inventive measuring device 3 is disposed beneath the fluid level to be measured.

Figure 4:
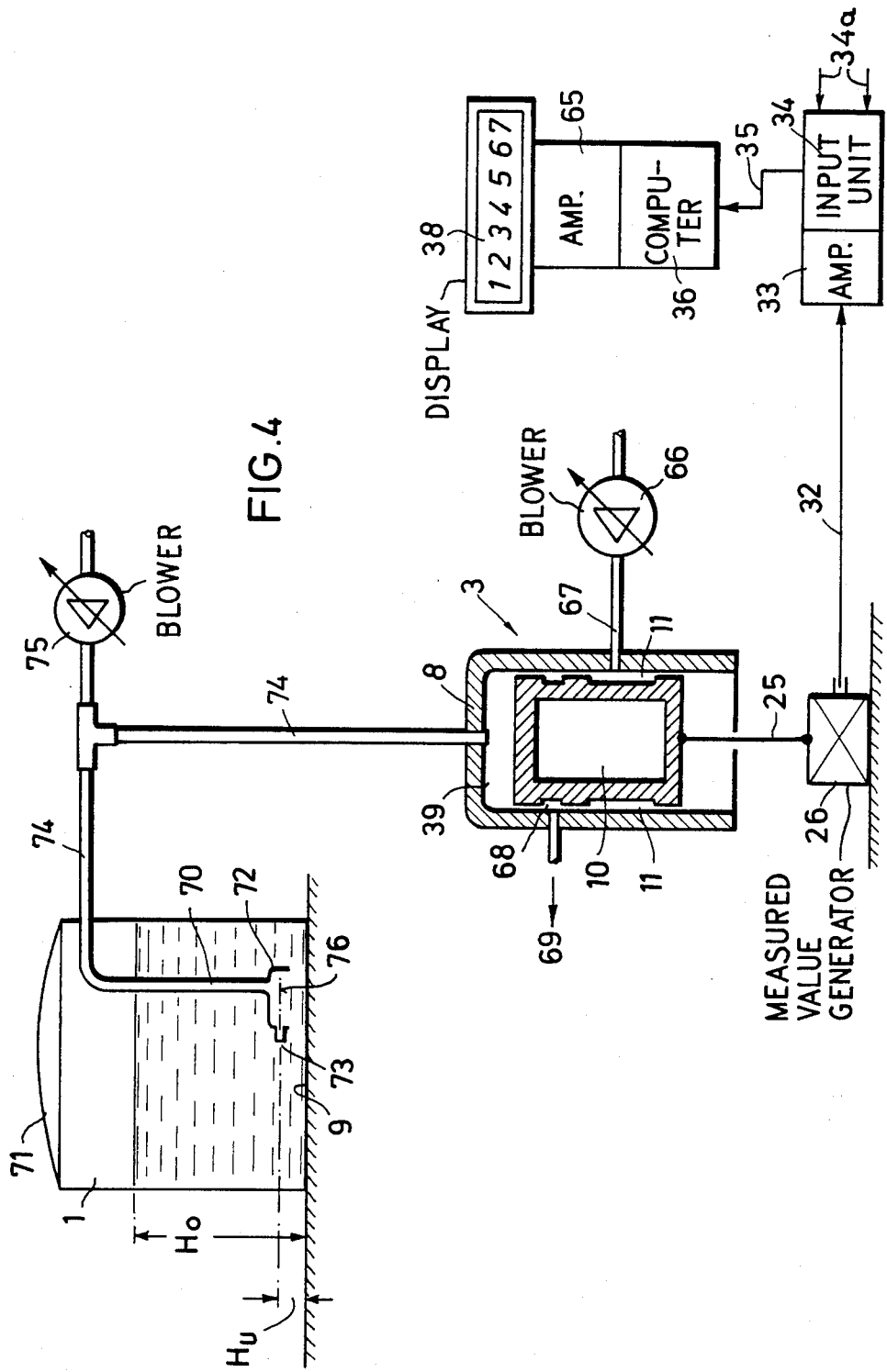
FIG. 4 is a further embodiment of the apparatus shown in FIG. 1, partly in section, utilizing pneumostatic gas lubrication of the measuring piston.

A significantly simplified but functionally equivalent measuring installation is shown in FIG. 4. Again, the measuring device 3 for measuring the pressure of fluid in the tank 1 includes a cylinder 8 and a measuring piston 10. In the embodiment shown in FIG. 4, however, the measuring device 3 is charged with a pneumatic release agent. A gas, such as air, is supplied under pressure as the lubricant to the pockets 11 of the pistion 10 for contact-free guidance of the piston 10 within the cylinder 8. The air is introduced into the system from the atmosphere via a pressure line 67 with a volumetrically variable piston positive displacement blower. The air is introduced in a controlled amount and with a controlled pressure. An annular relief pocket 68 in the measuring piston 10 which cooperates with a discharge nozzle 69 in the jacket of the cylinder 8 is provided in order to prevent a flooding of confining air (release agent) from the pockets 11 into the measuring chamber 39. A measuring conduit 70 is disposed in the tank 1, proceeding from approximately the level of the roof 71 toward the floor 9. The measuring conduit 70 terminates in a small emersion bell 72, which has a discharge nozzle 73. The measuring conduit 70 is connected to the measuring line 74, which is in turn connected to a piston positive displacement pressure blower 75, also controllable as to output pressure and volume. The measuring piston 10 is supported by the support element 25 above the measured value generator 26 which, as in the embodiment described in FIG. 1, supplies an output signal via the signal line 32 to an amplifier 33 which is connected to an input unit 34. The input unit 34 supplies an output signal via line 35 to the computer 36, which in turn supplies an output signal to the display unit 38 via a post-amplifier 65.

Operation of the embodiment shown in FIG. 4 is as follows. When the blower 66 is placed in operation, the measuring piston floats within the cylinder 8 and is conducted contact and friction free therein. Subsequently, the blower 75 is placed in operation thereby conveying air in a controlled amount and at a controlled pressure into the measuring line 74 and the measuring conduit 70, as well as the emersion bell 72. The air fills the entire system up to the level 76 which is precisely defined by the discharge nozzle 73. The blower 75 is set for discharging air at a pressure which must be slightly higher than the pressure of the displaced fluid column and is operated with a constant delivery volume such that a few small air bubbles emerge from the discharge nozzle 73 per time unit. By monitoring the emergence of the bubbles, the measuring level 76 defined by the emersion bell 72 is precisely observed up to fractions of millimeters under all conditions and filling heights. The emergence of the bubbles can be monitored by any suitable means such as, for example, acoustic monitoring by means of a microphone installed at the emersion bell. The pressure thereby developed in the measuring line 74 thus exactly corresponds to the pressure of the fluid column between the upper fluid level $H_O$ and the constant lower measuring level $H_u$ (which corresponds to the reference fluid level 76). Given a change in the upper fluid level $H_O$ as a result of filling or emptying the tank 1, the corresponding weight change is measured in the same manner as described in connection with FIG. 1 and FIG. 3. The only difference in the embodiment shown in FIG. 4 in comparison to the previously-described embodiments is that no fluid is conducted in the measuring line 74 but instead the pressure of the fluid columns $H_O$ (or $H_u$) to be measured is transmitted of a gas (air) into the measuring chamber 39 and thus onto the surface of the piston 10. This embodiment has the advantage that the measuring line need not be filled with the agent to be measured, which is necessary in certain applications.

Figure 5:
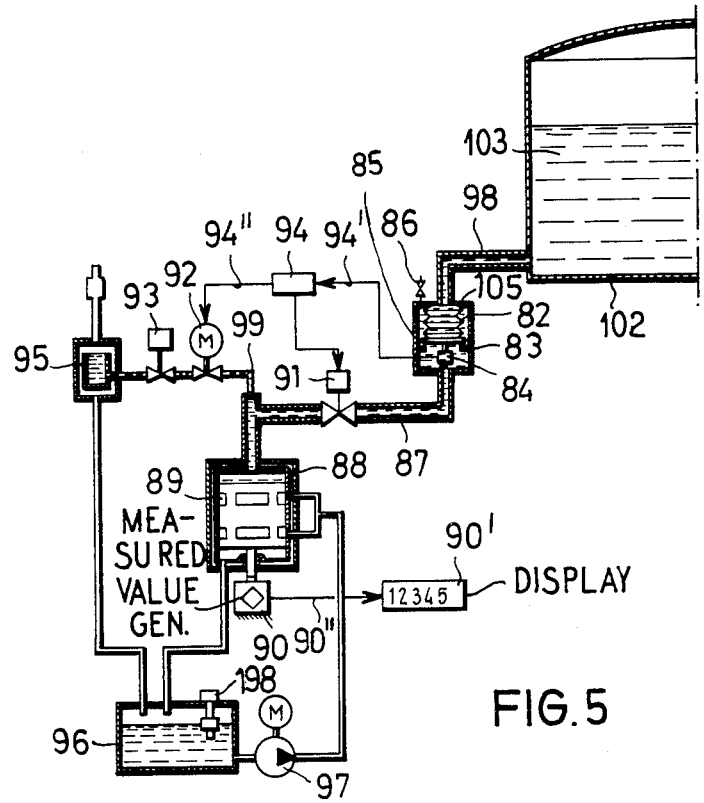
FIG. 5 is a schematic representation, partly in section, of another embodiment of a pressure-measuring device constructed in accordance with the principles of the present invention having a separating element for preventing contact of the fluid whose pressure is to be measured with the release agent.

A further embodiment of the invention is shown in FIG. 5 including a means for insuring separation between the release agent and the fluid whose pressure is to be measured. In the embodiment of FIG. 5, a fluid 103 such as, for example, a light oil, whose hydrostatic pressure P1 is to be measured is stored in the tank 102. The pressure of the fluid 103 is transmitted via a fluid line 98 to a metal bellows 82 which is disposed in a separating chamber 85. The bellows 82 is secured at its upper open end 100 to the cover 105 of the chamber 85 so that the interior of the bellows 82 is in communication with the fluid line 98, and thus with the fluid 103 in the tank 102. The hydrostatic fluid pressure $P_1$ of the fluid 103 stored in the tank 102 loads the interior cross-section of the bellows 82 with a force $K_1$. The separating chamber 85 into which the freely expandable end of the bellows 82 projects is connected to the measuring piston 89 via a measuring line 87. The measuring line 87 and the separating chamber 85 are filled with release agent. The hydrostatic pressure $P_1$ of the fluid 103 is thus transmitted to the measuring piston 89 via the expandable bellows 82 which causes a pressure $P_2$ of the release agent to be transmitted via the measuring line 87 to the measuring piston 89 without the fluid 103 and the release agent coming into contact.

The pressure $P_2$ of the release agent is directly transmitted to the freely expandable exterior of the bellows 82 and generates a cross-section force $K_2$ thereon. The bellows 82 is in a neutral position when the forces exhibit equilibrium, that is, when $K_1=K_2$.

The means for supplying the release agent is equipped with a hydraulic pump 97 which develops a pressure between the measuring piston 89 and the cylinder 88 so as to provide a friction-free hydrostatic separation as well as a seal between the measuring piston 89 and the cylinder 88. The measuring piston 89 is supported in the manner described earlier above a measured value generator 90 which is connected to suitable electronics as described above via a signal line 90" for displaying an output signal on the display 90'. Taking the effective surfaces of the measuring piston 89 and the tank 81 as well as a calibration characteristic for error correction into consideration, the mass of the stored fluid 103 is evaluated as described above.

In order to avoid measuring errors which may result from the spring characteristic of the bellows 82, the height position of the cover 82' for the bellows 82 is maintained at a constant level by means of a displacement pick-up 84, a motor controlled valve 92, and a regulator 94. The displacement pick-up is in the form of a differential transformer which generates an electric signal given mechanical displacement from a neutral position. This position-proportional signal is supplied via the signal 94' to the regulator 94 which converts the control signal into a setting pulse which is supplied to the motor M via line 94" for adjusting the valve 92. As a result of the adjustment of the valve 92, the return line 99 is opened to a greater or lesser degree, whereby the pressure $P_2$ of the release agent overflow, simultaneously functioning as a measuring fluid in the line 87 is controlled such that the ratio $K_1/K_2 = \text{constant} = 1$ is always retained, regardless of a change in the fluid pressure P1 at the side of the tank 102. The conveying pressure of the hydraulic pump 97 causes the release agent to emerge toward the top in the gap between the measuring piston 89 and the cylinder 88. The amount of release agent which escapes through the upper gap of the measuring piston 89 and the cylinder 88 is supplied to the line 87 as measuring fluid is regulated by the feedback control circuit including the transformer 84, the motor driven valve 92, and the regulator 94 such that the pressure $P_2$ is controlled so that the height position of the cover 82' of the bellows 82 is constantly maintained in the neutral position.

By closing a main valve 91, the zero point adjustment of the measuring device can be exactly monitored and-/or adjusted by means of an overflow vessel 95. In order to increase safety, the reservoir 96 of release agent is equipped with a float switch 98. If the level of release agent in the reservoir 96 rises to an impermissible level, the main valve 91 (controlled by the float switch 98 through the regulator 94) so that in addition to the metal bellows 82, the tank 81 is completely partitioned from the remainder of the measuring system in a safe manner.

A bleed valve 86 serves for bleeding the separating chamber 85. The feedback valve 93 is closed when the tank weighing means is shut off so that the motor driven valve 92 can remain in its adjusted position.

Figure 6:
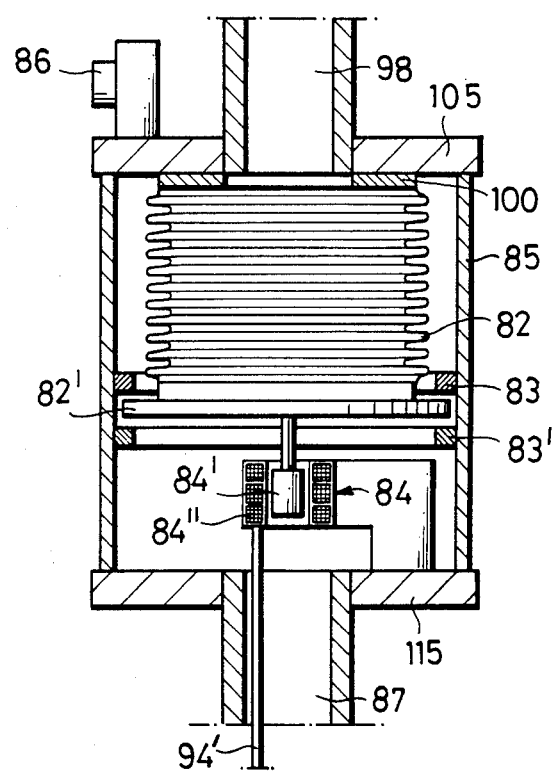
FIG. 6 is an enlarged sectional view of the separating chamber utilized in the embodiment of FIG. 5 showing the details thereof.

The separating chamber 85 is shown in greater detail in FIG. 6. As stated above, the bellows 82 is connected at its open upper end 100 to the cover 105 of the separating chamber 85. The interior of the bellows 82 is in direct communication with the liquid 103 in the tank 102 via the fluid line 98. The lower free end of the bellows 82 is closed with a terminating plate or cover 82'. The radial projection of the terminating cover 82' limits the amount of displacement of the bellows 82 between safety detents 83 and 83'. The displacement pick-up 84 has an induction core 84' secured to the terminating cover 82'. The pick-up 84 has a coil system 84", consisting in this embodiment of three windings arranged in a known manner, which is secured to the base plate 115 of the separating chamber 85. The signal line 94 extends inside the measuring line 87 and proceeds from the coil system 84" to the regulator 94. A bleed valve 86 is disposed at the cover 105 of the separating chamber 85.

The manner of operation of the separating chamber 85 and the expandable metal bellows 82 are as follows. It is first assumed that an equilibrium of forces prevails at the terminating cover 82' with regard to the force $K_1$ operating against the interior of the cover 82' and a corresponding force $K_2$ operating in the opposite direction from the exterior of the cover 82' such that $K_1 = K_2$ or, alternatively, $K_1/K_2 = 1 = \text{constant}$. The force $K_1$ is the product of the interior surface $F_1$ of the bellows 82 and the fluid pressure $P_1$ of the tank fluid 103; the force $K_2$ is the product of the exterior surface $F_2$ of the bellows 82 and the fluid pressure $P_2$ of the release agent supplied by the line 87. If one assumes that the weight of the suspended bellows 82 is entirely compensated by its spring characteristic in the neutral position, and further assuming that $F_1 = F_2$, then $P_1 = P_2$.

The fluid to be measured and the release agent are thus hermetically separated from one another by the bellows 82 functioning as a separating means without disadvantageously influencing the precision of the measurement.

In order that a change in $P_1$ cannot cause deterioration of the equilibrium $K_1/K_2=1$ by extending or contracting the bellows 82, precise retention of the neutral position must be guaranteed in order to obtain an error-free measurement. This is achieved by the feedback control means including the pick-up 84, the regulator 94, the motor driven valve 92, and the lines 94' and 94" connecting those elements. This feedback system provides an extremely sensitive position/pressure compensation control means in cooperation with a spring constant for the bellows 82.

Figure 7:
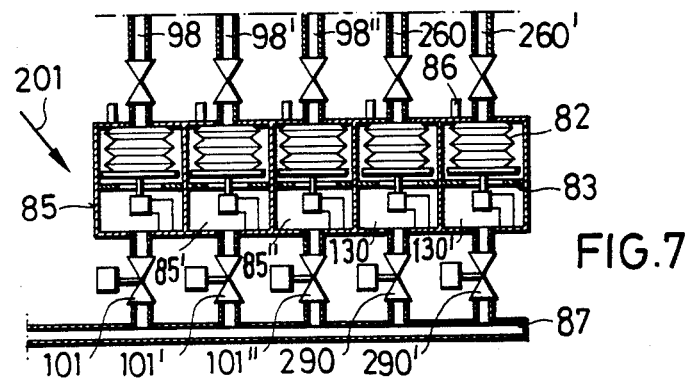
FIG. 7 is a schematic representation, partly in section, of a plurality of separating chambers arranged in a bank constructed in accordance with the principles of the present invention for measuring the pressures of different fluids in a plurality of different tanks.

A plurality of separating chambers 85, 85', 85", 130 and 130' are disposed in the embodiment shown in FIG. 7 in a bank 201. The separating chambers are respectively connected at their upper sides to a like plurality of fluid lines 98, 98', 98", 260 and 260'. Each fluid line discharges into the interior of the associated bellows 82. The respective interiors of the separating chambers may be individually connected to the measuring line 87 via respective switch elements 101, 101', 101", 290 and 290'. This bank of separating chambers may be used for sampling pressures $P_1$ from, for example, five different tanks. When, for example, the fluid pressure $P_1$ in the tank connected to the fluid line 98 is to be sampled, the switch element 101 is opened, whereas the remainder of the switch elements remain closed. Thus, the fluid column in the tank which is connected to the measuring means influences the release agent (simultaneously functioning as the measuring fluid) in the feed line 87 and is correspondingly measured and displayed by the measuring device. It will be understood that any number of separating chambers and associated lines and switching elements may be included in the bank 201 as needed.

In place of a metal bellows, the separating element may be in the form of a sensitive calibrated diaphragm disposed in the separating chamber and connected to the displacement pickup.

Other modifications and changes may be suggested by those skilled in the art, however, it is the intention of the inventor to embody within the patent warranted hereon all changes and modifications as reasonably and properly come within the scope of his contribution to the art.

I claim as my invention:

1. A method for measuring the stationary or quasi-stationary pressure of a fluid in a container comprising the steps of:
   charging a piston in a cylinder with a pressure head corresponding to the pressure of said fluid;
   supplying a release agent through a wall of said cylinder such that said release agent occupies a volume under pressure between said piston and said cylinder for lubrication thereof;
   developing the pressure for said release agent at least equal to said pressure of said fluid such that said piston is conducted contact-free within said cylinder; and
   generating an electronic signal corresponding to the force exerted by said piston due to said pressure head.

2. The method of claim 1 wherein said release agent is supplied at a higher pressure than said fluid whose pressure is to be measured.

3. The method of claim 1 wherein the step of supplying a release agent between said piston and said cylinder is further defined by the steps of:
   diverting a portion of said fluid whose pressure is to be measured for use as said release agent;
   increasing the pressure of said diverted portion of said fluid; and
   supplying said diverted portion of said fluid under pressure between said piston and said cylinder as said release agent.

4. The method of claim 1 wherein a liquid is employed as said release agent.

5. The method of claim 1 wherein a gas is employed as said release agent.

6. The method of claim 5 wherein said gas is air.

7. The method of claim 1 wherein the step of charging said piston is further defined by directly transmitting said fluid from said container to said cylinder for developing a pressure head for charging said piston.

8. The method of claim 1 wherein the step of charging said piston is further defined by introducing a gaseous intermediate fluid between said container and said piston for transmitting said pressure of said fluid in said container to said cylinder for charging said piston.

9. The method of claim 8 wherein said gaseous intermediate measuring fluid is air.

10. The method of claim 1 wherein said container is a bulk storage tank and wherein said fluid whose pressure is to be measured is a petroleum product.

11. The method of claim 1 comprising the additional step of continuously maintaining said fluid and said release agent separated such that said fluid and said release agent do not mix with one another.

12. The method of claim 11 wherein the step of separating said fluid and said release agent is further defined by inserting a resilient separating element between said fluid and said release agent for transmitting pressure therebetween but preventing mixing of said fluid and said release agent.

13. The method of claim 12 comprising the additional step of maintaining the force on one side of said separating element. element generated by the pressure of said fluid in equilibrium with the force on the release agent side of said separating element.

14. An apparatus for measuring the stationary or quasi-stationary pressure of a fluid in a container in fluid communication with said apparatus comprising:
   a piston in a cylinder;
   a means for charging said piston with a pressure head corresponding to the pressure of said fluid;
   a means for supply a release agent through a wall of said cylinder such that said release agent occupies a volume between said piston and said cylinder at a pressure at least equal to said pressure of said fluid for lubrication thereof such that said piston is conducted contact-free within said cylinder;
   a plurality of pockets disposed inside said cylinder for accumulating said release agent for developing the pressure for said release agent, said pockets connected to said means for supplying said release agent; and
   a means for generating an electronic signal corresponding to the amount of force exerted by said piston due to said pressure head.

15. The apparatus of claim 14 wherein said pockets are disposed in an interior wall of said cylinder.

16. The apparatus of claim 14 wherein said pockets are disposed in an exterior wall of said piston.

17. The apparatus of claim 14 further comprising:
a collecting trough disposed in a floor of said cylinder for collecting said release agent; and
a leakage return line interconnected between said collecting trough and said means for supplying said release agent for returning said release agent for reuse thereof.

18. The apparatus of claim 14 wherein said means for generating an electronic signal includes a measured value generator and further comprising:
a floor for said cylinder having a central opening therein;
a support element extending through said central opening and connected to said piston and said measured value generator for supporting said piston relative to said measured value generator.

19. The apparatus of claim 14 wherein said means for generating an electronic signal comprises:
a measured value generator connected to said piston for generating a coarse signal corresponding to the force exerted by said piston due to said pressure head;
a computer; and
an input unit interconnected between said measured value generator and said computer, said input unit has a plurality of inputs for entering selected further parameters into said computer for use in combination with said coarse signal from said measured value generator for calculating the weight of said fluid in said container.

20. The apparatus of claim 19 wherein one of said further parameters is the size of the effective piston surface of said piston on which said pressure head acts.

21. The apparatus of claim 19 wherein one of said further parameters is the integral of the effective cross-sectional area of said container changing under the influence of temperature and weight forces of said fluid at different heights.

22. The apparatus of claim 14 further comprising:
a separating chamber interconnected between said container and said cylinder;
a resilient separating element disposed in said separating chamber such that one side of said separating element is acted on by said fluid in said container and an opposite side of said separating element is acted upon by said release agent, said separating element normally assuming a neutral position with forces acting thereon due to said fluid and said release agent in equilibrium;
a monitor means for detecting movement of said separating element from said neutral position; and
a regulator means connected to said monitor means for regulating the pressure of said release agent so as to oppose any change in pressure of said fluid.

23. The apparatus of claim 22 wherein said resilient separating element is an expandable bellows having an open end secured to said separating chamber such that the interior of said bellows is acted upon by said fluid in said container, and having a closed opposite end acted upon by said release agent.

24. The apparatus of claim 22 wherein said monitor means includes an electrical displacement pick-up for generating a position-proportional signal, said pick-up being connected to said regulator means for controlling the pressure of said release agent such that said separator element remains in said neutral position.

25. The apparatus of claim 24 wherein said regulator means includes a regulator and a motor-driven valve operated by said regulator, said regulator having an input connected to said displacement pick-up, said motor-driven valve being disposed in a return line from said cylinder for said release agent.

26. The apparatus of claim 22 further comprising a radial projection extending from said closed end of said bellows, and a spaced pair of detents mounted in the interior of said cylinder for engaging said radial projection for limiting displacement of said bellows.

27. The apparatus of claim 14 further comprising a plurality of said separating chambers disposed in a bank and respectively connected via a network to a plurality of containers, each of said separating chambers having a switch element interconnected between said separating chamber and said cylinder for supplying release agent to selected ones of said separating chambers.

28. An apparatus for measuring the stationary or quasi-stationary pressure of a fluid in a container comprising:
a supply line connected to said container;
a cylinder connected to said supply line so as to be in fluid communication with said container;
a piston disposed in said cylinder and being displaceable therein by the pressure head developed in said cylinder by said fluid in said container;
a branch line connected to said supply line for diverting a portion of said fluid therefrom;
a pump connected to said branch line for supplying said diverted portion of said fluid from said branch line to said cylinder at a pressure at least equal to said pressure developed in said cylinder by said fluid in said container through a plurality of channels in a wall of said cylinder such that said diverted portion of said fluid occupies a volume between said piston and said cylinder;
said piston having a plurality of pockets in registry with said channels for accumulating said diverted portion of said fluid for developing pressure for said diverted portion such that said piston floats contact-free within said cylinder;
a measured value generator connected to said piston for generating an electrical signal corresponding to the force exerted by said piston due to said pressure head; and
a means connected to said measured value generator for computing the weight of said fluid based on said force exerted by said piston.

* * * * *